(12) United States Patent
Askan

(10) Patent No.: US 11,695,269 B2
(45) Date of Patent: Jul. 4, 2023

(54) ELECTRICAL AC/DC CONVERSION ARRANGEMENT

(71) Applicant: Eaton Intelligent Power Limited, Dublin (IE)

(72) Inventor: Kenan Askan, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 110 days.

(21) Appl. No.: 17/267,868

(22) PCT Filed: Jul. 29, 2019

(86) PCT No.: PCT/EP2019/070324
§ 371 (c)(1),
(2) Date: Feb. 11, 2021

(87) PCT Pub. No.: WO2020/035296
PCT Pub. Date: Feb. 20, 2020

(65) Prior Publication Data
US 2021/0175704 A1 Jun. 10, 2021

(30) Foreign Application Priority Data
Aug. 16, 2018 (DE) ...................... 10 2018 119 916.3

(51) Int. Cl.
*H02H 7/125* (2006.01)
*H02H 3/087* (2006.01)
(Continued)

(52) U.S. Cl.
CPC .......... *H02H 7/1257* (2013.01); *H02H 3/087* (2013.01); *H02H 7/16* (2013.01); *H02M 1/32* (2013.01); *H02M 7/219* (2013.01)

(58) Field of Classification Search
CPC ........ H02H 7/1257; H02H 3/087; H02H 7/16; H02M 1/32; H02M 7/219
(Continued)

(56) References Cited

U.S. PATENT DOCUMENTS 5,687,049 A * 11/1997 Mangtani ............. H02H 7/1227
363/51
10,033,196 B2 * 7/2018 Kim ....................... H02M 7/217
(Continued)

FOREIGN PATENT DOCUMENTS

CN        2755620 Y     2/2006
CN     106452125 A     2/2017
(Continued)

*Primary Examiner* — Yemane Mehari
(74) *Attorney, Agent, or Firm* — Leydig, Voit & Mayer, Ltd.

(57) ABSTRACT

An AC/DC converter includes an AC circuit breaker, configured as a hybrid circuit or semiconductor circuit breaker; a rectifier; a smoothing capacitor; a semiconductor switch connected in series with the smoothing capacitor; and a first isolation relay for galvanic isolation. One input of the AC circuit breaker forms an AC input of the converter. One output of the AC circuit breaker is connected with an input of the rectifier. The smoothing capacitor, and the first semiconductor switch, connect a first output of the rectifier with its second output. The first output of the rectifier is connected with one input of the first isolation relay. The one output of the first isolation relay forms a first DC output of the AC/DC converter. The AC circuit breaker, the first semiconductor switch, and the first isolation relay are interconnected.

15 Claims, 2 Drawing Sheets

(51) Int. Cl.
*H02H 7/16* (2006.01)
*H02M 1/32* (2007.01)
*H02M 7/219* (2006.01)

(58) Field of Classification Search
USPC .......................................................... 363/52
See application file for complete search history.

(56) References Cited

U.S. PATENT DOCUMENTS

| 11,374,391 | B2* | 6/2022 | Askan | ................. H02H 7/1257 |
| 2016/0028219 | A1 | 1/2016 | Habu et al. | |
| 2017/0149346 | A1 | 5/2017 | Mouridsen | |

FOREIGN PATENT DOCUMENTS

| CN | 106663940 | A | 5/2017 |
| DE | 112013006487 | T5 | 10/2015 |
| DE | 202016107453 | U1 | 1/2017 |
| EP | 2955529 | A2 | 12/2015 |
| KR | 20030015589 | A | 2/2003 |
| WO | WO 2015028634 | A1 | 3/2015 |

* cited by examiner

ELECTRICAL AC/DC CONVERSION ARRANGEMENT

CROSS-REFERENCE TO PRIOR APPLICATIONS

This application is a U.S. National Phase Application under 35 U.S.C. § 371 of International Application No. PCT/EP2019/070324, filed on Jul. 29, 2019, and claims benefit to German Patent Application No. DE 10 2018 119 916.3, filed on Aug. 16, 2018. The International Application was published in German on Feb. 20, 2020 as WO 2020/035296 A1 under PCT Article 21(2).

FIELD

The invention relates to an electrical AC/DC conversion arrangement.

BACKGROUND

FIG. 1 shows an electrical AC/DC conversion arrangement. This AC/DC conversion arrangement consists of the following, respectively separate components:
- a rectifier 3, including the actual rectifier 21 as well as a capacitor 4 attached to the output of the rectifier 21, particularly a so-called capacitor bank,
- input coils 20, which are designated as "boost inductance,"
- an electromechanical AC circuit breaker 30 with a typical response time of 5 to 9 ms for protection against short circuits on the alternating current side with long direct current lines,
- AC protection 31 with a typical response time of 20 to 30 ms for ensuring galvanic isolation and in order to switch a nominal current or an operating current,
- "fast" safety fuses 32 for protecting the rectifier 3, respectively the diodes for the case of a fault between the rectifier 3 and the capacitor bank, as both the AC circuit breaker 30 and the AC protection 31 would be too slow to ensure protection in a case of this type,
- an electromechanical DC circuit breaker 34 with a typical response time of 5 to 9 ms for short-circuit protection on the direct current side,
- a DC isolator 35 with a typical response time of 20 to 30 ms for ensuring galvanic isolation.

In addition, the unit has an EMC filter 33 as well as a direct current distributor 36, to which different loads can be connected, wherein respectively an additional direct current circuit breaker 29 is connected to the respective outputs of the direct current distributor 36. The respective components are thus interconnected as shown in FIG. 1. In addition, the arrangement may have respectively following the direct current circuit breakers 29, one isolator respectively.

As can be seen from this unit, the protection of systems or units of this type is very expensive, and requires a large number of different, separate devices. In particular, special direct current protection devices and direct current power switches are necessary there. As the breaking of large direct currents is significantly harder, due to the lack of zero crossing of the voltage, than the breaking of alternating currents, direct current devices of corresponding power are respectively technically significantly more costly than comparable alternating current devices. These are not only more complex in construction, but also have greater volume, and are also more cost-intensive, due to greater complexity, than comparable alternating current devices.

SUMMARY

In an embodiment, an electrical AC/DC conversion arrangement is provided that includes: an AC circuit breaker, which is configured as a hybrid circuit breaker or as a semiconductor circuit breaker; a rectifier; at least one smoothing capacitor; a semiconductor switch connected in series with the at least one smoothing capacitor; and at least one first isolation relay for galvanic isolation. One input of the AC circuit breaker forms an AC input of the electrical AC/DC conversion arrangement. One output of the AC circuit breaker is connected, at least indirectly, with an input of the rectifier. The at least one smoothing capacitor, and the first semiconductor switch connected in series with the at least one smoothing capacitor, connect a first output of the rectifier with a second output of the rectifier. The first output of the rectifier is connected, at least indirectly, with one input of the first isolation relay. One output of the first isolation relay forms a first DC output of the electrical AC/DC conversion arrangement and is provided for connection to at least one direct current consumer. The AC circuit breaker, the first semiconductor switch, and the first isolation relay are interconnected, at least indirectly.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Embodiments of the present invention provide an electrical AC/DC conversion arrangement, by which the disadvantages mentioned can be avoided, and by which the protection of an electrical AC/DC conversion arrangement can be ensured easily and with little expense with regard to the number and the type of the components that are necessary.

As a result, a reliable electrical AC/DC conversion arrangement can be created, which has significantly fewer components than is the case with known AC/DC conversion assemblies. In addition, it is no longer necessary to use special direct current devices, which are able to extinguish a direct current arc, as the breaking occurs on the AC side and is supported by the first semiconductor switch of at least one smoothing capacitor.

In the present arrangement, it is possible for the first isolation relay to be formed like a conventional AC isolation relay, which does not comprise any DC arc extinguishing device, even though it is arranged on the direct current side.

In addition, safety fuses on the AC side can be dispensed with. In the AC side, the electromechanical AC circuit breaker, as well as the safety fuses, are replaced by a single hybrid, respectively semiconductor circuit breaker device.

On the DC side, no special DC switchgear at all and also no automatic switch is necessary. Instead of expensive DC switchgear, only a power semiconductor switch is in use, which is interconnected in series with the at least one smoothing capacitor, respectively a capacitor bank.

It can therefore be determined that due to the present methods, a significantly reduced amount of switchgear is necessary in order to ensure protection of an electrical AC/DC conversion arrangement, wherein in particular no technically costly and complex DC circuit breaker and DC power switch is necessary. In addition, safety fuses that are cumbersome to handle can be dispensed with. As these must be replaced in the event of a fault and must be stocked accordingly, the availability of the system can be significantly increased by virtue only of the fact that no safety fuses are required.

In addition, the present invention also relates, to a method for breaking at least a portion of a particular electrical AC/DC conversion arrangement.

The invention will be described in more detail with reference to the appended drawings, in which preferred embodiments are shown by way of examples.

Figure 2:
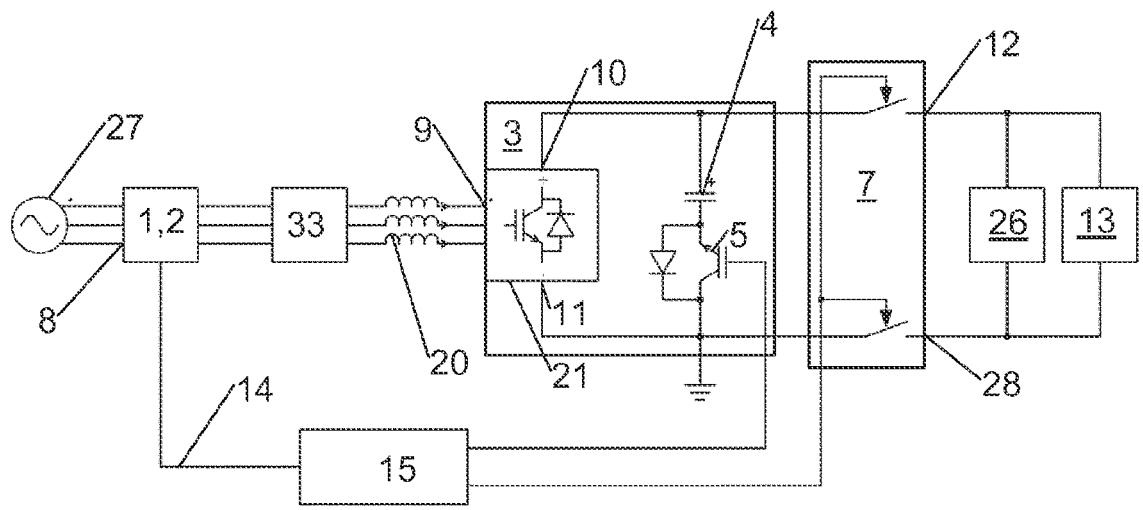
FIG. 2 shows a schematic view of a first embodiment of a particular electrical AC/DC conversion arrangement.
Figure 3:
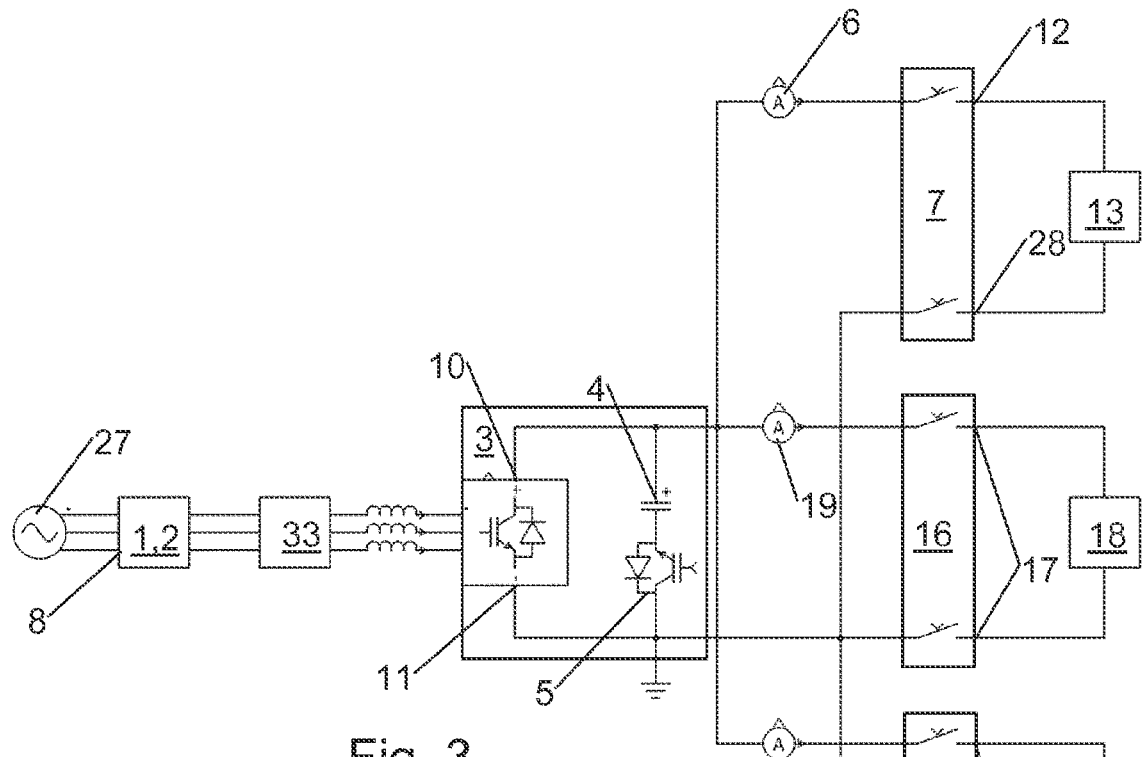
FIG. 3 shows a schematic view of a second embodiment of a particular electrical AC/DC conversion arrangement.
Figure 4:
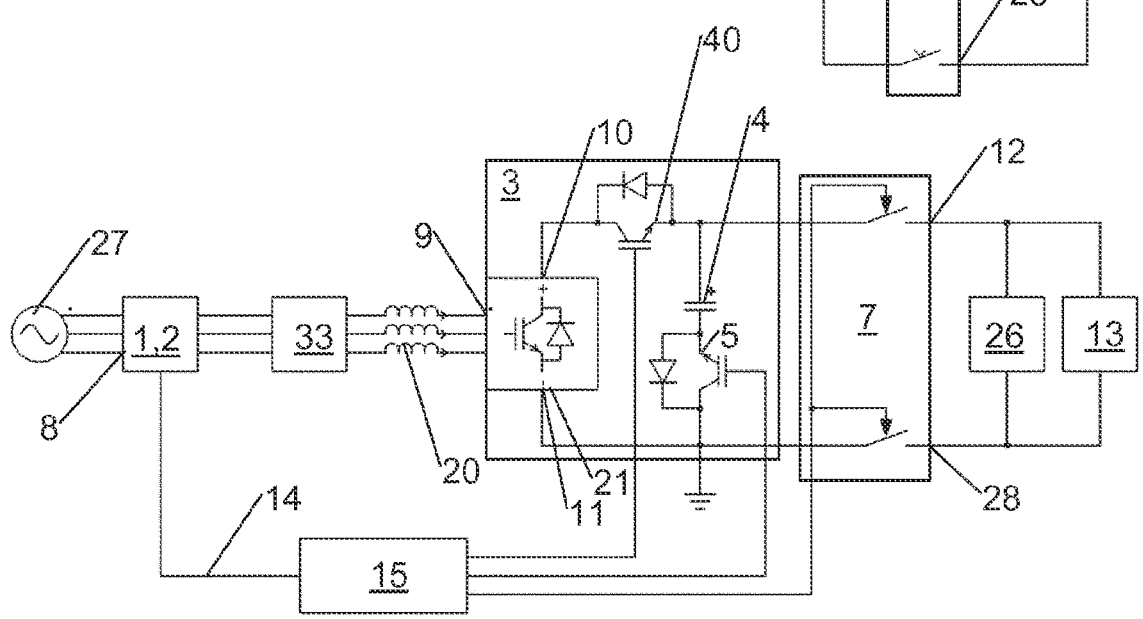
FIG. 4 shows a schematic view of a third embodiment of a particular electrical AC/DC conversion arrangement.

FIGS. 2, 3 and 4 respectively show an electrical AC/DC conversion arrangement including at least the following components:

an AC circuit breaker 1, which is configured either as a hybrid circuit breaker 2 or as a semiconductor circuit breaker, and a rectifier 21, and at least one smoothing capacitor 4 and a first semiconductor switch 5 connected to it in series, and at least one isolation relay 7 for galvanic isolation.

The particular electrical AC/DC conversion arrangement comprises in particular no additional circuit protection devices on the AC side.

The particular electrical AC/DC conversion arrangement comprises particular no circuit protection device or so-called automatic switches on the DC side.

The particular unit shown in the figures is grounded with a conductor. The unit can, however, also be configured without grounding or with a grounded average potential.

The AC circuit breaker 1 is a so-called hybrid circuit breaker 2 or a semiconductor circuit breaker. Semiconductor circuit breakers interrupt a current exclusively using at least one power semiconductor, which has current flowing through it constantly. Hybrid circuit breakers 2 comprise a parallel circuit consisting of a bypass switch and a power semiconductor switch, and also preferably isolating contacts for galvanic isolation. A circuit protection device of this type is known, for example, from WO 2015/028634 A1 of the applicant.

The AC circuit breaker 1 forms the alternating current input 8 or the alternating current inputs 8 of the particular unit. In the schematic illustrations, an AC source 27 is indicated, which is respectively shown as an alternating current source. The concrete number of external AC supply conductors, as well as the availability of the neutral conductor, are in particular not essential and non-limiting. The AC circuit breaker 1 is designed accordingly and a number of AC circuit breakers 1 can be provided in parallel.

One output of the AC circuit breaker 1, or the outputs of the AC circuit breaker 1, are at least indirectly connected with one input 9, or inputs, of the rectifier 21 in terms of control technology. An EMC filter 33 is preferably connected between the AC circuit breaker 1 and the rectifier 21.

The unit comprises a rectifier 21. The rectifier switching arrangement 21 preferably includes a preset number of switchable half-bridges, as are known from inverter technology. The rectifier 21 can also be constructed differently.

The unit comprises at least one smoothing capacitor 4, which naturally can be formed of any desired number of interconnected discrete capacitors 4.

It is preferably provided that the rectifier 21 and the smoothing capacitor 4 are integral parts of an "active rectifier 3." An "active rectifier 3" of this type can be designated as an "active front end".

Furthermore, it can be provided that the illustrated input coils 20, which may be called a "boost inductance", are also formed together with the rectifier 21. A unit of this type may be designated as a "boost converter".

A semiconductor switch 5 is connected in series with the smoothing capacitor 4. The first semiconductor switch 5 is preferably of IGBT or MOSFET construction. Furthermore, when the semiconductor switch 5 is of IGBT construction, a so-called antiparallel diode is provided, as shown in FIGS. 2, 3 and 4. This arrangement forms a bidirectional switch. Several parallel-connected first semiconductor switches 5 can also be arranged at this location.

The arrangement of the first semiconductor switch 5 at this location has considerable resistance, and therefore, also considerably lower losses than the alternative arrangement of a solid-state circuit breaker on the DC side in series with the load.

The combination of the smoothing capacitor 4 and the first semiconductor switch 5 connected to it in series connects the first output 10 of the rectifier 21 with the second output 11 of the rectifier 21, as shown in FIGS. 2, 3, and 4.

It is provided, according to a particularly preferred variant embodiment, that the at least one smoothing capacitor 4 and the first semiconductor switch 5 are formed together with the rectifier 21 as a single-piece unit.

The first isolation relay 7 is provided to ensure galvanic isolation. The first output 10 of the rectifier 21 is at least indirectly connected with one input of the first isolation relay 7 in terms of circuitry. The rectifier 21 comprises two outputs of different polarity. It is preferably provided that the first isolation relay 7 comprises two inputs and two outputs, and also correspondingly two switching paths with respectively one breaker point, and also that both outputs 10, 11 of the rectifier 21 are connected to the first isolation relay 7, as shown in FIGS. 2, 3 and 4.

It is possible in the particular arrangement that the first isolation relay 7 is formed like a conventional AC isolation relay, which does not comprise any DC arc extinguishing device, even though it is arranged on the direct current side.

Here it should be noted that—according to the first and second preferred embodiments—no additional semiconductor switch is arranged in the connecting cables between the outputs 10, 11 of the rectifier 21 and the first isolation relay 7. The corresponding connections are therefore free of switches.

According to the third preferred embodiment, as shown in FIG. 4, it is further provided that the arrangement comprises a second semiconductor switch 40, which is connected between the first output 10 of the rectifier 21 and the smoothing capacitor 4.

The output 12 or the outputs 12, 18 of the first isolation relay 7 form a first DC output of the arrangement and are provided for connection to at least one first direct current consumer 13. Here, no additional direction current circuit breaker is necessary. Here both outputs of different polarities are only depicted in FIG. 2 respectively with a separate reference symbol. Furthermore, in FIG. 2 an electrical fault 26 is shown on the DC side.

The unit or arrangement comprises a first current sensor according to a preferred development, which is preferably arranged between the first output 10 of the rectifier 3 and the first isolation relay 7. This is shown in FIG. 3. The first current sensor 6 can also be designated a current measurement device. Here the first current sensor 6 serves for the detection of overcurrents or to determine prior to the opening of the first isolation relay 7, that this is also actually current-free.

For short-circuit current detection, the arrangement comprises in particular a unit for detection of desaturation of the first semiconductor switch 5. The corresponding detector unit can, for example, be formed as a part of a driver circuit of the first semiconductor switch 5, and is preferably formed as a part of the control and monitoring unit 15. The fundamental function of detection of a short circuit by supervising the saturation condition of a particular power semiconductor is described in WO 2015/028634 A1 of the applicant, already mentioned. A particular advantage of a unit of this type is the particularly short detection time, which allows a short-circuit to already be switched off while the short-circuit current is still small.

The AC circuit breaker 1, the first semiconductor switch 5, the optional first current sensor 6, the unit for detecting a desaturation and the first isolation relay 7 are connected at least indirectly together in terms of control technology. The relevant components as well as, possibly, additional components can thus be connected by different means, wherein it is in particular provided that the AC circuit breaker 1 and/or the first semiconductor switch 5 and/or the first current sensor 6 and/or the first isolation relay 7 and/or the unit for detecting a desaturation of a bus 14 are at least indirectly connected. This bus 14 can be formed for example from a number of control lines, which are operated at 24 V or 28 V. However, any other form of bus 14, for example a Modbus or USB, can be provided. A radio connection can also be provided, however.

A reliable electrical AC/DC conversion arrangement can be achieved by the particular unit, which has considerably fewer components than is the case with known AC/DC conversion arrangements. In addition, it is no longer necessary here to use special direct current switchgear, which are able to extinguish a DC arc, as the switching off occurs on the AC side and is supported by the first semiconductor switch 5 and at least one smoothing capacitor 4.

Furthermore, safety fuses can be dispensed with on the AC side. On the AC side, the electromechanical AC circuit breaker 30 of the AC power switch 31, as well as the safety fuses 32, are replaced by a hybrid or semiconductor circuit protection device 2.

On the DC side, no special DC switchgear, and also, no automatic switches are necessary at all. Instead of costly DC switchgear, only one power semiconductor switch 5 comes into use, which is connected in series to the at least one smoothing capacitor 4 or capacitor bank.

It can therefore be determined that, due to the particular methods, a considerably reduced amount of switchgear is necessary in order to ensure the protection of an electrical AC/DC conversion arrangement, wherein in particular no technically intricate and cost-intensive DC circuit breakers are necessary. Furthermore, safety fuses 32 that are cumbersome to handle can be dispensed with. As they must be replaced in the event of a fault and must be stocked accordingly, the system availability can be considerably increased due only to the fact that no safety fuses 32 are necessary. The particular arrangement is therefore configured free of safety fuses.

For controlling the particular arrangement, it is provided that this includes as additional components at least one already mentioned control and monitoring unit 15. This control and monitoring unit 15 can either be configured as a self-contained unit, or be integrated into one of the other components. It is correspondingly provided that the control and monitoring unit 15 be at least connected indirectly, in terms of control technology, with the AC circuit breaker 1, the first semiconductor switch 5, the optional first current sensor 6 and the first isolation relay 7. Furthermore, it is preferred to connect the control and monitoring unit 15 with the rectifier 21. Provided that the control and monitoring unit 15 is already integrated into this component, the connection with this component naturally becomes redundant. In this case, one of the components is then a master, while the other components, correspondingly, are slaves. The relevant control intelligence can thus be arranged on different components.

The control and monitoring unit 15 is designed in particular to including a µC or µP. The unit for detecting desaturation is preferably integrated into the control and monitoring unit 15.

Upon detection of a preset short-circuit current on the DC side, it is provided that, in a first step, the first semiconductor switch 5 as well as the AC circuit breaker are switched off. The relevant components are accordingly controlled for that purpose. The DC current is immediately limited by opening the first semiconductor switch 5. The subsequent flow of alternating current is stopped by opening the AC circuit breaker 1.

According to a preferred development, it can be provided, that in addition, or substantially simultaneously with the switching off of the first semiconductor 5 and the AC circuit breaker 1, the active switching elements of the rectifier 21 are also switched off.

Upon detection of a preset overcurrent on the DC side, it is recommended to first provide that the active switching elements of the rectifier 21 are switched off first, and subsequently, or substantially simultaneously, the first semiconductor switch 5 and the AC circuit breaker 1 are switched off.

The detection of the overcurrent can occur by means of the first current sensor 6. Alternatively, an overcurrent can be recognized by means of a driver circuit of the rectifier 21. Furthermore, the rectifier 21 can also limit an overcurrent with a suitable design using PWM.

As previously stated, it is provided that the arrangement comprises a unit for detection of desaturation of the first semiconductor switch 5, whereby overcurrents, primarily rapidly rising short-circuit currents, can be recognized and switched off considerably faster. The rapidly rising current leads to a desaturation of the first semiconductor switch 5. This is recognized by the suitably designed unit as a detection of desaturation, which thereupon triggers the additional switch off processes. Suitably designed drivers are known from the technical field of inverter technology.

As soon as the current on the DC side is zero, the first isolation relay 7 can be opened without arcing. Here, either the current can be measured by means of the first current sensor 6, or a preset first time period is allowed to expire before a switch-off pulse is sent to the first isolation relay 7.

In an arrangement with only one load path, as shown in FIG. 2, no special requirements are imposed on the switching speed of the first isolation relay 7.

The control and monitoring unit 15 is preferably designed to control the components in accordance with said method for switching off at least one part of an electrical AC/DC conversion arrangement.

Figure 1:
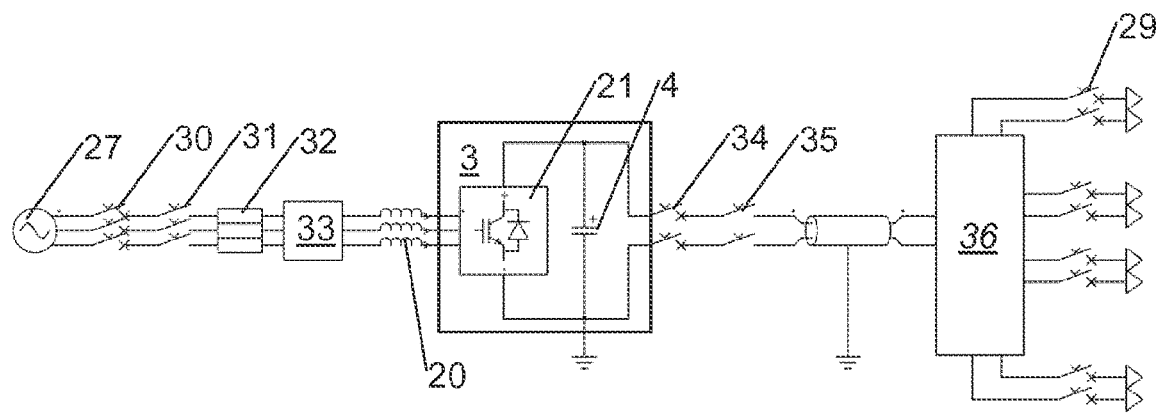
FIG. 1 shows an electrical AC/DC conversion arrangement according to the prior art, as a schematic view.

FIG. 3 shows a second preferred embodiment. This comprises two additional DC branches, hence three parallel-connected DC branches in all, with respectively one self-contained isolation relay 7, 16, 22. Here, any number of parallel DC branches 7, 16, 22 can be provided. The AC side, as well as the first DC branch including the first isolation relay 7, are unchanged in relation to FIG. 1.

The second isolation relay 16 is connected, with one input parallel in terms of control technology to the first isolation relay 7, to the first output 10 of the rectifier 21. One output of the second isolation relay 16 forms a second DC output 17 of the arrangement and is provided for connection to at least one second direct current consumer 18. A second current sensor 19 is arranged between the first output 10 of the rectifier 21 and the second isolation relay 16. The second isolation relay 16 and the second current sensor 19 are at least indirectly connected in terms of control technology with the AC circuit breaker 1 and the first semiconductor switch 5.

The third isolation relay 22 is connected with one input parallel to the first isolation relay 7 in terms of control technology to the first output 10 of the rectifier 21. One output of the third isolation relay 22 forms a third DC output 23 of the arrangement and is provided for connection to at least one third DC consumer 24. A third current sensor 25 is arranged between the first output 10 of the rectifier 21 and the third isolation relay 22. The third isolation relay 22 and the third current sensor 25 are at least indirectly connected in terms of control technology with the AC circuit breaker 1 and the first semiconductor switch 5.

In particular, the second or third isolation relay 16, 22 are connected in terms of control technology with the control and monitoring unit 15.

This unit offers additional advantages compared to the prior art. Both the semiconductor switches and the hybrid switchgear are considerably faster than conventional mechanical switchgear. The reaction time of the first semiconductor switch 5 amounts to a few µs. The particular AC circuit breaker 1 used typically has a response time of at most 500 µs. This makes it possible, upon detection of an overcurrent or a short-circuit current in only one of the DC subnetworks arranged in parallel, to switch off the entire unit in a short time, to thereby bring the current to zero, to open the respective isolation relay 7, 16, 22 and subsequently to again switch on the remainder of the unit. This entire sequence can occur in less than one millisecond. This is short enough to allow the connected consumers of the remaining "healthy" subnetworks to continue to operate undamaged. These do not "notice" the short switching-off period at all. A fault can thereby be quickly and easily isolated, while the remainder of the unit, wherein no DC circuit breakers are necessary, continues to operate reliably.

Upon detection of a present overcurrent, particularly a short-circuit current, by means of the second current sensor 19, it is therefore provided that, in a first step, the first semiconductor switch 5 as well as the AC circuit breaker 1 are switched off and subsequently, as long as the current at the second isolation relay is zero, in a second step a switch-off pulse is sent to the second isolation relay 16, and after the opening of the second isolation relay 16, in a third step the first semiconductor switch 5 and the AC circuit breaker 1 are switched on again, whereby the remaining unit is again supplied with current.

FIG. 4 shows a third preferred embodiment. This corresponds largely to the first preferred embodiment, wherein however a second semiconductor switch 40 is provided, which second semiconductor switch 40 is connected between the first output 10 of the rectifier 21 and the smoothing capacitor 4, and the second semiconductor switch 40 is connected in terms of control technology with the control and monitoring unit 15. Here the control and monitoring unit 15 is additionally designed, upon detection of the preset overcurrent or of a short-circuit current, to also switch off the second semiconductor switch 40 in the first step.

The particular combination of the first semiconductor switch 5 and the second semiconductor switch 40 is considerably more efficient than the arrangement of an SSCB on the DC side. In addition, the particular arrangement of rectifier 21 and second semiconductor switch 40 makes bidirectional current flow possible.

The particular arrangement can be completely formed or constructed from individual components. It can, however, be further provided that at least two, particularly all, components are arranged as an integrated unit in a common housing. A compact construction is thereby obtained and cabling errors can be prevented.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical AC/DC conversion arrangement comprising:
   an AC circuit breaker, which is configured as a hybrid circuit breaker or as a semiconductor circuit breaker;
   a rectifier;
   at least one smoothing capacitor;
   a first semiconductor switch connected in series with the at least one smoothing capacitor; and
   at least one first isolation relay for galvanic isolation, wherein one input of the AC circuit breaker forms an AC input of the electrical AC/DC conversion arrangement, wherein one output of the AC circuit breaker is connected, at least indirectly, with an input of the rectifier, wherein the at least one smoothing capacitor and the first semiconductor switch connect a first output of the rectifier with a second output of the rectifier, wherein the first output of the rectifier is connected, at least indirectly, with one input of the first isolation relay, wherein one output of the first isolation relay forms a first DC output of the electrical AC/DC conversion arrangement and is provided for connection to at least one direct current consumer, and wherein the AC circuit breaker, the first semiconductor switch, and the first isolation relay are interconnected, at least indirectly.

2. The electrical AC/DC conversion arrangement according to claim 1, wherein the rectifier and the at least one smoothing capacitor are integral parts of an active rectifier.

3. The electrical AC/DC conversion arrangement according to claim 1, wherein the electrical AC/DC conversion arrangement comprises at least one control and monitoring unit, and wherein the control and monitoring unit is connected, at least indirectly, with the AC circuit breaker, the first semiconductor switch, and the first isolation relay.

4. The electrical AC/DC conversion arrangement according to claim 3, wherein the control and monitoring unit is connected in terms of control technology with the second isolation relay, and wherein the control and monitoring unit is configured such that, upon detection of a present overcurrent by the second current sensor, to switch off the first semiconductor switch as well as the AC circuit breaker in a first step, and subsequently, to send in a second step a switch-off pulse to the second isolation relay after the expiration of a preset time period, and to switch the first semiconductor switch and the AC circuit breaker on again in a third step after the opening of the second isolation relay.

5. The electrical AC/DC conversion arrangement according to claim 1, wherein the electrical AC/DC conversion arrangement comprises a desaturation detector for detecting a desaturation of the first semiconductor switch, is the desaturation detector being configured as a part of a control and monitoring unit.

6. The electrical AC/DC conversion arrangement according to claim 5, wherein the control and monitoring unit is configured such that, upon detection of a preset overcurrent or a short circuit current, to switch off, in a first step, the first semiconductor switch as well as the AC circuit breaker, and subsequently send a switch-off pulse to a first isolation relay.

7. The electrical AC/DC conversion arrangement according to claim 6, wherein the control and monitoring unit is also configured such that, upon detection of the preset overcurrent or a short-circuit current, to switch off the second semiconductor switch in a first step.

8. The electrical AC/DC conversion arrangement according to claim 1, wherein the electrical AC/DC conversion arrangement also comprises a first current sensor for overcurrent detection, the first current sensor being arranged between the first output of the rectifier and the first isolation relay and is connected with the control and monitoring unit.

9. The electrical AC/DC conversion arrangement according to claim 1, wherein the electrical AC/DC conversion arrangement also comprises a second semiconductor switch, wherein the second semiconductors switch is configured to be controllably switched between the first output of the rectifier and the at least one smoothing capacitor, and wherein the second semiconductor switch is configured to be controlled by a control and monitoring unit.

10. The electrical AC/DC conversion arrangement according to claim 1, wherein the electrical AC/DC conversion arrangement comprises at least two isolation relays, wherein one input of the second isolation relay is connected to the first output of the rectifier parallel to the first isolation relay, wherein one output of the second isolation relay forms a second DC output of the electrical AC/DC conversion arrangement and is provided for connection to at least one second direct current consumer, wherein a second current sensor is arranged between the first output of the rectifier and the second isolation relay, and wherein the second isolation relay and the second current sensor are at least indirectly connected in terms of control technology with the AC circuit breaker and the first semiconductor switch.

11. The electrical AC/DC conversion arrangement according to claim 1, wherein at least two components are arranged as integrated units in a common housing.

12. A method of switching off at least a part of the electrical AC/DC conversion arrangement according to claim 1, the method comprising:

detecting a preset overcurrent or a short-circuit current, switching off the first semiconductor switch and the AC circuit breaker, and subsequently opening the first isolation relay.

13. The electrical AC/DC conversion arrangement according to claim 1, wherein the first output of the rectifier is on a first path, the second output of the rectifier is on a second path, the first semiconductor switch and the at least one smoothing capacitor form a series arrangement on a third path, and the third path connects the first output of the rectifier to the second output of the rectifier.

14. The electrical AC/DC conversion arrangement according to claim 1, wherein the isolation relay is interposed between, on a first side, the first semiconductor switch and the at least one smoothing capacitor, and on a second side, the at least one first isolation relay.

15. An electrical AC/DC conversion arrangement comprising:

an AC circuit breaker, which is configured as a hybrid circuit breaker or as a semiconductor circuit breaker;

a rectifier;

at least one smoothing capacitor;

a first semiconductor switch connected in series with the at least one smoothing capacitor; and at least one first isolation relay for galvanic isolation, wherein one input of the AC circuit breaker forms an AC input of the electrical AC/DC conversion arrangement, wherein one output of the AC circuit breaker is connected, at least indirectly, with an input of the rectifier, wherein the at least one smoothing capacitor and the first semiconductor switch connect a first output of the rectifier with a second output of the rectifier, wherein the first output of the rectifier is connected, at least indirectly, with one input of the first isolation relay, wherein one output of the first isolation relay forms a first DC output of the electrical AC/DC conversion arrangement and is provided for connection to at least one direct current consumer, wherein the AC circuit breaker, the first semiconductor switch, and the first isolation relay are interconnected, at least indirectly, wherein the electrical AC/DC conversion arrangement comprises at least one control and monitoring unit, wherein the control and monitoring unit is connected, at least indirectly, with the AC circuit breaker, the first semiconductor switch, and the first isolation relay wherein the control and monitoring unit is connected in terms of control technology with the second isolation relay, and wherein the control and monitoring unit is configured such that, upon detection of a present overcurrent by the second current sensor, to switch off the first semiconductor switch as well as the AC circuit breaker in a first step, and subsequently, to send in a second step a switch-off pulse to the second isolation relay after the expiration of a preset time period, and to switch the first semiconductor switch and the AC circuit breaker on again in a third step after the opening of the second isolation relay.

* * * * *